United States Patent [19]

Arabshian et al.

[11] 4,364,700
[45] Dec. 21, 1982

[54] BALE-HANDLING APPARATUS

[76] Inventors: John Arabshian, Rte. 3, Wapaca, Wis. 54981; Paul O. Mittelstaedt, Rte. 1, Box 61, Weyauwega, Wis. 54983

[21] Appl. No.: 198,773

[22] Filed: Oct. 20, 1980

[51] Int. Cl.³ .................. A01D 87/12; B66F 9/00
[52] U.S. Cl. ............................ 414/24.5; 414/697; 414/703
[58] Field of Search ............ 414/24.5, 24.6, 680, 414/685, 697, 703, 712, 721, 911; 180/53 C

[56] References Cited

U.S. PATENT DOCUMENTS

| | | | |
|---|---|---|---|
| 2,731,161 | 1/1956 | Carstens | 414/703 |
| 3,416,686 | 12/1968 | Penrod | 414/685 X |
| 3,851,780 | 12/1974 | Martin | 414/703 |
| 3,957,167 | 5/1976 | Jacobson et al. | 414/703 |
| 4,002,147 | 1/1977 | Feterl | 414/703 X |
| 4,068,774 | 1/1978 | Howell | 414/703 |
| 4,302,139 | 11/1981 | Malish | 414/24.5 |

FOREIGN PATENT DOCUMENTS

| | | | |
|---|---|---|---|
| 228673 | 6/1960 | Australia | 414/703 |
| 225613 | 1/1963 | Austria | 414/703 |
| 1278070 | 10/1961 | France | 414/721 |
| 663948 | 1/1952 | United Kingdom | 414/703 |
| 1032995 | 6/1966 | United Kingdom | 414/703 |

Primary Examiner—Leslie J. Paperner
Attorney, Agent, or Firm—Nicholas A. Kees

[57] ABSTRACT

An apparatus for lifting and carrying large cylindrical hay blades weighing up to 1500 pounds. The apparatus includes a support bar which connects to the conventional three-point hitch of a tractor by means of a flange on the end of said support bar and two support members which are attached to flange near the center of said support bar. The other end of the support bar is connected to a bale-carrying assembly, which includes a vertical member, a horizontal member attached perpendicularly to the bottom of the vertical member, and fork portions connected one to each end of the horizontal member. The angle of the bale-carrying assembly with respect to the support bar is controlled by means of a hydraulic cylinder connected between the two, and controlled from the tractor.

3 Claims, 5 Drawing Figures

BALE-HANDLING APPARATUS

BACKGROUND OF THE INVENTION

In a relatively new method of baling hay, large cylindrical bales weighing up to 1500 pounds are formed. In order to reduce labor costs, it is desirable that a one-man operation be able to load these bales onto wagons to bring them in from the fields, and then unload them to feed them to livestock. While apparatus are known for handling these cylindrical bales, these apparatus are limited in their usefulness, in that a wagon cannot be hitched to the tractor to which they are attached, or the apparatus do not lift bales high enough to put them on and take them off a wagon. Thus a need exists for a simple apparatus which does not have these limitations.

SUMMARY OF THE INVENTION

The invention includes a support bar which attaches, by means of a flange and a v-shaped bracket, to the standard three-point hitch of a tractor. The opposite end of the support bar is pivotably connected to a bale-carrying assembly. A hydraulic ram, aligned with the support bar, is attached between a flange on the support bar and the bale-carrying assembly to control the attitude of the assembly. The support bar is constructed of an outer metal tube with another metal tube inserted into it for added strength.

One object of the invention is to provide an improved bale-handling apparatus.

Another object of the invention is to provide an improved bale-handling apparatus which is attachable to the standard three-point hitch of a tractor.

A more specific object of the invention is to provide an improved bale-handling apparatus having hydraulic means, controllable from the tractor, for controlling the attitude of the bale-carrying assembly.

Another specific object of the invention is to provide an improved bale-handling apparatus which can lift bales high enough to put them onto or take them off a wagon or truck.

Other objects and advantages of the invention will be stated or appear hereinafter.

DESCRIPTION OF THE PREFERRED EMBODIMENTS

Figure 1:
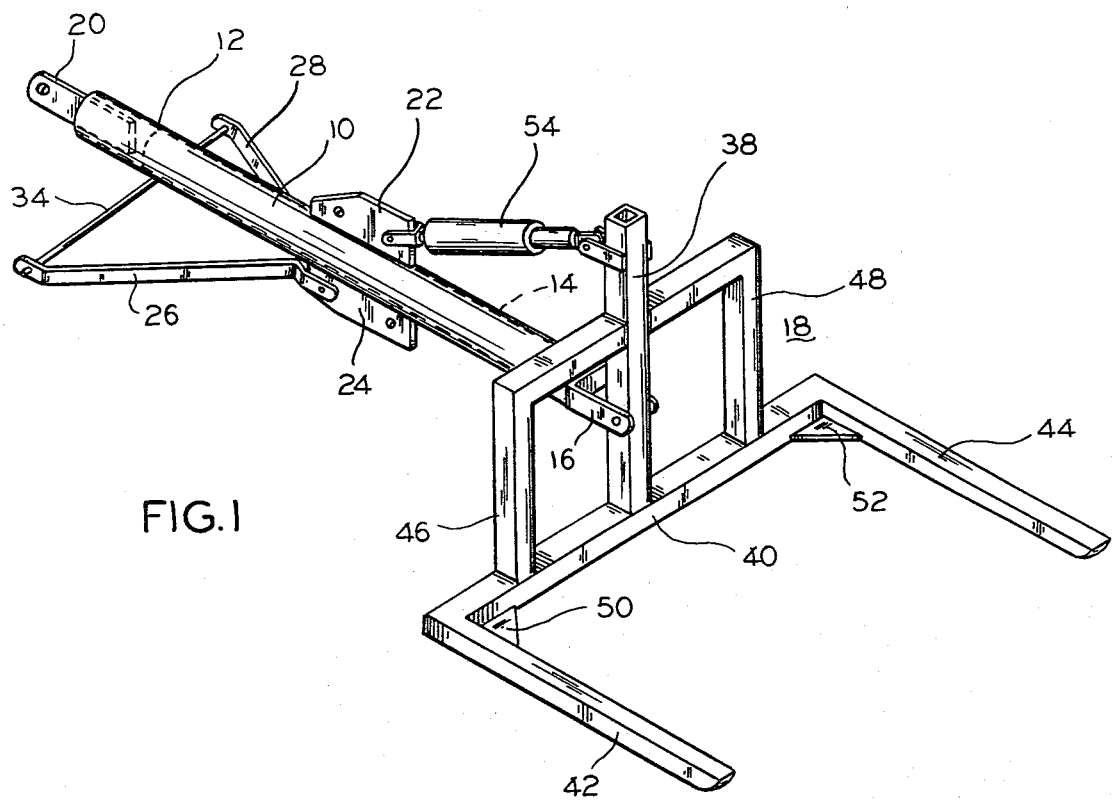
FIG. 1 is an isometric view of an apparatus embodying the invention.

Referring to FIG. 1, a main support bar 10 is constructed of an outer tube 12 and an inner tube 14, in order to give more strength than is possible for a single tube, but less weight than a solid member. To one end of support bar 10 is attached a U-shaped bracket 16 which in turn is pivotally attached to a bale-carrying assembly, indicated generally at 18. Attached to support bar 10 at the end opposite bracket 16 is a flange 20. This flange is attached partially inside tube 12 by suitable means, such as welding. Two more flanges 22 and 24 are attached to support bar 10 as shown in FIGS. 1, 4 and 5, along the edges of the bar.

Figure 2:
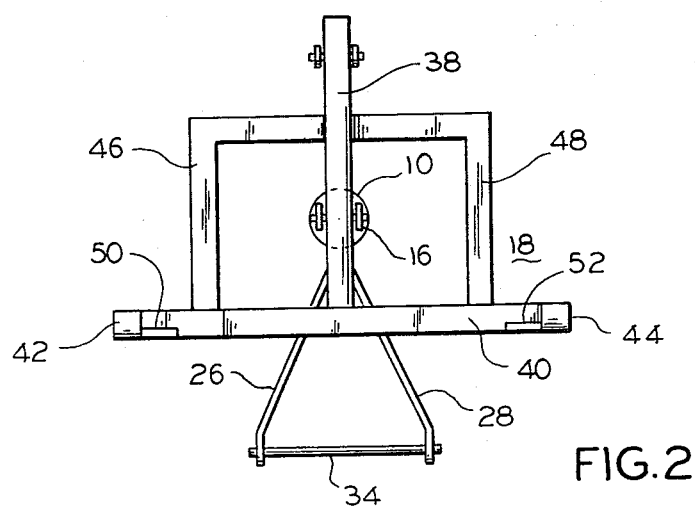
FIG. 2 is a front view of the apparatus shown in FIG. 1.
Figure 5:
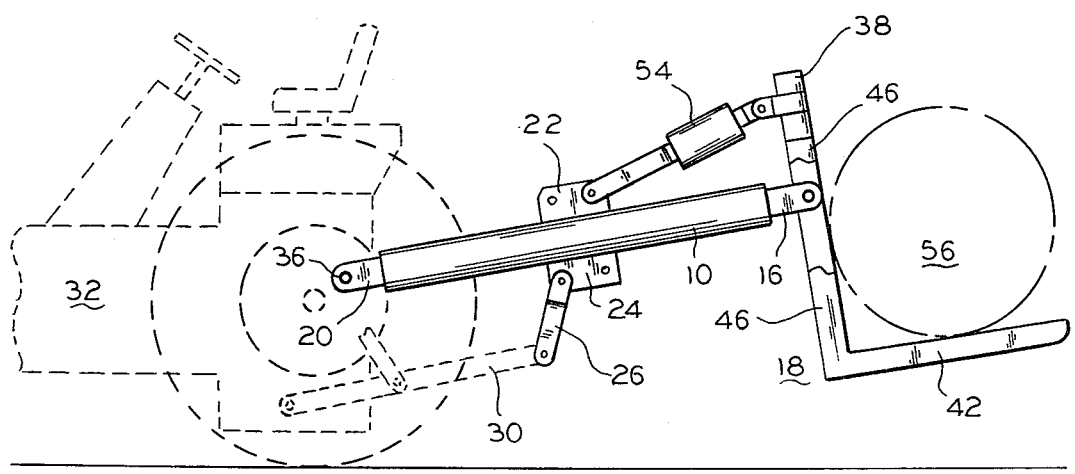
FIG. 5 is a side view of the apparatus shown in FIG. 1, showing the attachment to the tractor and showing a bale being lifted by the apparatus.

In one embodiment, shown in FIGS. 1, 2 and 5, the lower flange 24 is then pivotably connected to support members 26 and 28, which in turn are connected to power links 30 of a tractor 32 by pivotable means such as a rod 34. These two power links 30 are two of the connecting points of the conventional three-point hitch of tractor 32. The third connecting point is formed by removing the standard swingable stabilizer link (not shown) of a normal three-point hitch and connecting flange 20 to the pivot point 36 usually occupied by the stabilizer link.

Figure 3:
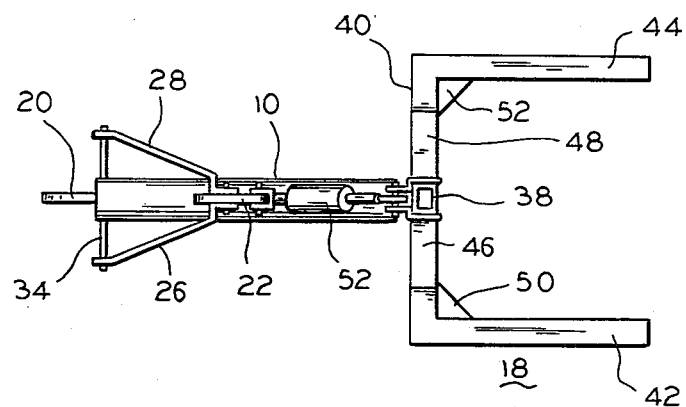
FIG. 3 is a top view of an apparatus similar to that shown in FIG. 1.
Figure 4:
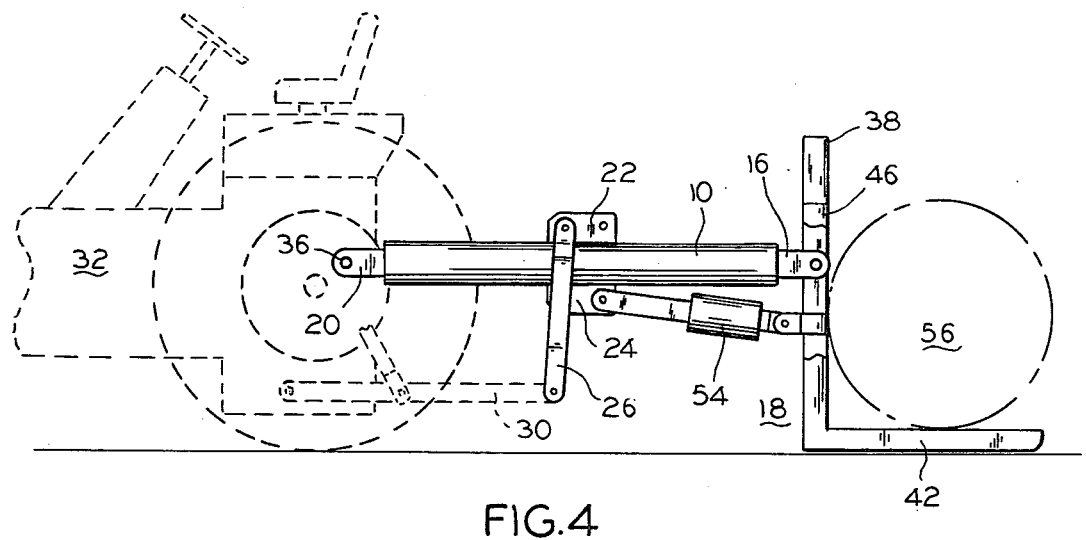
FIG. 4 is a side view of the apparatus shown in FIG. 3, showing the attachment to the three-point hitch of the tractor.

In the other embodiment, shown in FIGS. 3 and 4, support members 26 and 28 are connected to upper flange 22. This arrangement provides greater stability than the above-described embodiment, although the maximum height to which the assembly 18 can be lifted is somewhat reduced.

Thus, in either embodiment the apparatus is easily and directly attached to the conventional three-point hitch of a tractor. Further, both embodiments provide a great deal of lift due to the leverage between the power links 30, support members 26 and 28, and support bar 10.

The bale-carrying assembly 18 includes a vertical portion 38, which is the part that is connected to bracket 16. To the bottom of vertical portion 38 is connected a horizontal portion 40, which in turn has fork portions 42 and 44 projecting perpendicularly to both the horizontal and vertical portions, one of said fork portions being attached to each end of the horizontal portion. The bale-carrying assembly is completed by two L-shaped braces 46 and 48, each of which is attached between the vertical portion and one side of the horizonal portion, and two flanges 50 and 52, attached between the horizontal portion and one fork portion, all of which are added for support and strength.

Finally, a hydraulic cylinder 54 runs between the upper flange 22 and the vertical portion 38 of bale-carrying assembly 18. The purpose of this cylinder is to control the relative angle between assembly 18 and support bar 10. Alternatively, cylinder 54 can be run between lower flange 24 and vertical portion 38, as shown in FIG. 4, which results in the cylinder sustaining a compression force rather than a tension force.

In operation, fork portions 42 and 44 are lowered to the ground by lowering power arms 3, and then leveled with the ground by means of hydraulic cylinder 54, as shown in FIG. 4. The tractor 30 is then backed up so that these fork portions slide under a bale 56. The bale can then be lifted by raising the power arms 30 as shown in FIG. 4. Once raised, the bale 56 can be placed on a wagon or other carrier by tilting bale-carrying assembly 18 by use of cylinder 54, so that the bale rolls or slides off the fork portions.

While the apparatus hereinbefore described is effectively adapted to fulfill the aforesaid objects, it is to be understood that the invention is not intended to be confined to the particular preferred embodiments of bale-handling apparatus herein set forth inasmuch as they are susceptible of various modifications without departing from the scope of appended claims.

We claim:

1. An apparatus for handling forage bales, connectable to the three-point hitch of a tractor, comprising:
   a unitary support bar comprising a single metal member extending outwardly away from the back of the tractor;
   an upper flange secured to the uppermost side of said support bar;
   a lower flange secured to the underside of said support bar aligned approximately vertically beneath said upper flange;
   an end flange, secured to one end of said support bar, and pivotably attached to the pivot point on said tractor usually occupied by the stabilizer arm of the three-point hitch;
   connecting means for connecting said one end of said support bar to the three-point hitch such that said support bar is held approximately horizontally outwardly from the tractor, including two support arms connected between one of said upper and lower flanges and the power arms of the three-point hitch;
   carrying means, pivotably connected to the opposite end of said support bar, for sliding under and carrying the forage bales; and
   pivoting means comprising a single hydraulic cylinder one end of which is connected to the one of said upper and lower flanges opposite the one to which said two support arms are attached, and the other end of which is connected to said carrying means at a point different than where said support bar is connected to said carrying means, for pivoting said carrying means on its pivotable connection to various angles with respect to said support bar, said hydraulic cylinder being hydraulically connected to the tractor such that the action of said hydraulic cylinder, and hence the pivoting of said carrying means, is controlled from the tractor.

2. An apparatus as recited in claim 1 wherein:
   said carrying means includes:
   a vertical member pivotably attached to said support bar at approximately the middle of said member,
   a horizontal member fixedly attached perpendicularly at the bottom of said vertical member, and
   two fork portions secured one to each end of said horizontal member perpendicular to both said vertical and horizontal members, extending outwardly away from the tractor; and
   said two support arms are pivotable connected between said lower flange and the three point hitch, while said hydraulic cylinder is connected between said upper flange and said vertical member of said carrying means.

3. An apparatus as recited in claim 1 wherein:
   said carrying means includes;
   a vertical member pivotably attached to said support bar at approximately the middle of said member;
   a horizontal member fixedly attached perpendicularly at the bottom of said vertical member, and
   two fork portions secured one to each end of said horizontal member perpendicular to both said vertical and horizontal members, extending outwardly away from the tractor; and
   said two support arms are pivotably connected between said upper flange and the three point hitch, while said hydraulic cylinder is connected between said lower flange and said vertical member of said carrying means.

* * * * *